(12) United States Patent
Yamakawa et al.

(10) Patent No.: US 10,658,966 B2
(45) Date of Patent: May 19, 2020

(54) MOTOR DRIVING APPARATUS, REFRIGERATOR, AND AIR CONDITIONER

(71) Applicant: Mitsubishi Electric Corporation, Tokyo (JP)

(72) Inventors: Takashi Yamakawa, Tokyo (JP); Koichi Arisawa, Tokyo (JP); Yosuke Shinomoto, Tokyo (JP); Shigeo Umehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/313,662

(22) PCT Filed: Aug. 2, 2016

(86) PCT No.: PCT/JP2016/072670
§ 371 (c)(1),
(2) Date: Dec. 27, 2018

(87) PCT Pub. No.: WO2018/025331
PCT Pub. Date: Feb. 8, 2018

(65) Prior Publication Data
US 2019/0229669 A1 Jul. 25, 2019

(51) Int. Cl.
*H02P 27/08* (2006.01)
*H02P 25/22* (2006.01)
(Continued)

(52) U.S. Cl.
CPC .............. *H02P 27/08* (2013.01); *F24F 11/70* (2018.01); *H02P 6/182* (2013.01); *H02P 21/18* (2016.02);
(Continued)

(58) Field of Classification Search
CPC ...... H02P 1/00; H02P 1/04; H02P 1/46; H02P 1/465; H02P 1/24; H02P 1/26; H02P 1/42;
(Continued)

(56) References Cited

U.S. PATENT DOCUMENTS 7,439,697 B2 * 10/2008 Miyazaki ................ H02M 7/48
318/400.41
7,952,236 B2 * 5/2011 Mitsutani .................. B60L 3/12
307/10.1
(Continued)

FOREIGN PATENT DOCUMENTS

JP 05-103497 A 4/1993
JP 2005-130592 A 5/2005
(Continued)

OTHER PUBLICATIONS

International Search Report dated Nov. 1, 2016 issued in corresponding international patent application No. PCT/JP2016/072670.

*Primary Examiner* — Antony M Paul
(74) *Attorney, Agent, or Firm* — Posz Law Group, PLC

(57) ABSTRACT

Provided is a motor driving apparatus used for driving a motor including a first winding group and a second winding group to which three-phase alternating-current voltages are applied. The motor driving apparatus includes a first inverter and a second inverter; the first inverter applies an alternating-current voltage to the first winding group; and the second inverter applies an alternating-current voltage to the second winding group. A first induced voltage detector, a second induced voltage detector, and a third induced voltage detector are provided as voltage detectors for detecting induced voltages induced either in the first winding group or in the second winding group.

13 Claims, 10 Drawing Sheets

(51) Int. Cl.
  *H02P 6/182*   (2016.01)
  *H02P 23/03*   (2006.01)
  *H02P 27/06*   (2006.01)
  *H02P 21/18*   (2016.01)
  *H02P 21/22*   (2016.01)
  *F24F 11/70*   (2018.01)

(52) U.S. Cl.
  CPC .............. *H02P 21/22* (2016.02); *H02P 23/03* (2013.01); *H02P 25/22* (2013.01); *H02P 27/06* (2013.01)

(58) Field of Classification Search
  CPC .... H02P 3/00; H02P 1/16; H02P 1/163; H02P 1/265; H02P 1/28; H02P 1/54; H02P 3/04; H02P 3/06; H02P 3/08; H02P 3/18; H02P 4/00; H02P 5/00; H02P 5/46; H02P 5/48; H02P 5/50; H02P 6/00; H02P 6/002; H02P 6/005; H02P 6/06; H02P 21/00; H02P 23/00; H02P 25/00; H02P 27/00; H02P 27/04; H02P 27/06; H02P 6/08; H02P 6/085; H02P 6/20; H02P 11/00; H02P 21/0035; H02P 21/0032; H02P 21/146; H02P 21/148; H02P 23/03; H02P 25/021; H02P 25/145; H02P 25/22; H02P 6/04; H02M 1/00; H02M 5/00; H02M 7/00; H02M 7/42
  USPC .... 318/400.01, 400.02, 400.14, 400.15, 700, 318/701, 721, 779, 799, 800, 801, 430, 318/490, 504
  See application file for complete search history.

(56) References Cited

U.S. PATENT DOCUMENTS

| | | | | |
|---|---|---|---|---|
| 8,497,648 | B2* | 7/2013 | Tagome | B60L 50/51 318/400.41 |
| 2008/0265832 | A1* | 10/2008 | Tan | H02P 1/029 318/802 |
| 2011/0057591 | A1 | 3/2011 | Tagome et al. | |

FOREIGN PATENT DOCUMENTS

| | | |
|---|---|---|
| JP | 2007-151366 A | 6/2007 |
| JP | 2007-288859 A | 11/2007 |
| JP | 2011-024377 A | 2/2011 |
| JP | 5527025 B2 | 6/2014 |
| WO | 2009/144957 A1 | 12/2009 |
| WO | 2014/087907 A1 | 6/2014 |

* cited by examiner

MOTOR DRIVING APPARATUS, REFRIGERATOR, AND AIR CONDITIONER

CROSS REFERENCE TO RELATED APPLICATION

This application is a U.S. national stage application of International Patent Application No. PCT/JP2016/072670 filed on Aug. 2, 2016, the disclosure of which is incorporated herein by reference.

TECHNICAL FIELD

The present invention relates to a motor driving apparatus for driving a motor, a refrigerator, and an air conditioner.

BACKGROUND

Patent Literature 1 below discloses a technique for driving a synchronous motor having a multi-group winding structure including a plurality of three-phase windings. In the disclosed technique, a synchronous motor has two groups of windings, one group driven by a master inverter and another group driven by a slave inverter, and both invertors calculate an estimated phase angle from a voltage command related to the rotating coordinates and a current detection signal as well as from the circuit constant and the estimated speed of the motor; an average calculation unit obtains the average of the estimated phase angles; a speed estimation unit calculates an estimated speed from the average; and a position integration unit calculates an estimated reference phase by performing temporal integration on the estimated speed.

PATENT LITERATURE

Patent Literature 1: Japanese Patent No. 5527025

Not only in a synchronous motor but also when any motor is driven at a low rotation speed, i.e., at a low speed, because the inertial driving force of the motor is weak, it is necessary to control the motor with high accuracy in order to drive the motor stably. However, because the technique disclosed in Patent Literature 1 uses the average of currents flowing in a plurality of winding groups, it has the following problem: controllability is worse than in the case of controlling a normal motor that does not have a multi-group winding structure.

SUMMARY

The present invention has been made in view of the above, and an object thereof is to obtain a motor driving apparatus capable of reducing the worsening of controllability in a low-speed range even when controlling a motor having a multi-group winding structure.

The present invention is made to solve the problem and achieve the objective mentioned above and relates to a motor driving apparatus for driving a motor. The motor driving apparatus includes a plurality of winding groups, each of the winding groups comprising three winding portions to which a three-phase alternating-current voltage is applied, and each of the winding groups forming an electrically independent circuit. The motor driving apparatus includes at least one inverter applying the alternating-current voltage to at least one of the winding groups; and an induced voltage detector detecting an induced voltage induced by at least one of the winding portions of at least one of the winding groups.

According to the present invention, it is possible to reduce the worsening of controllability even when controlling a motor having a multi-group winding structure.

DETAILED DESCRIPTION

Hereinafter, a motor driving apparatus, a refrigerator, and an air conditioner according to embodiments of the present invention will be described in detail with reference to the drawings. The present invention is not limited to the following embodiments.

Embodiment

Figure 1:
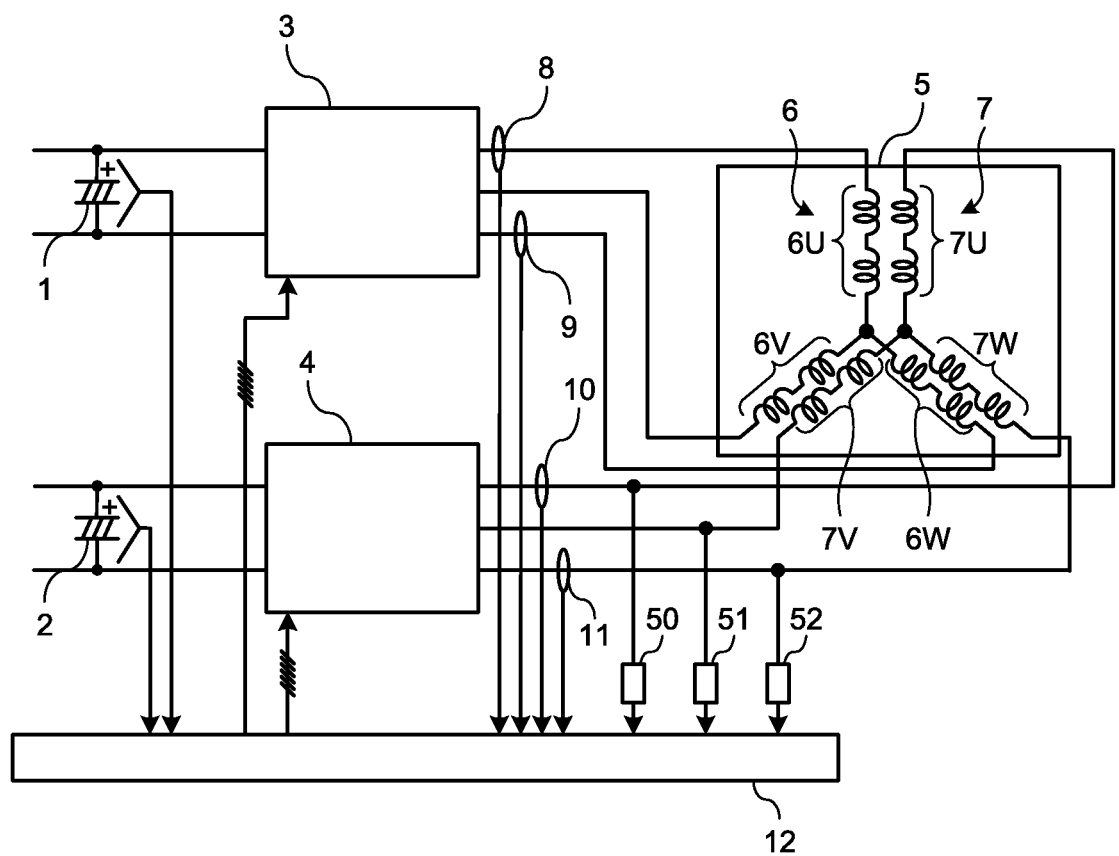
FIG. 1 is a circuit diagram illustrating a configuration of a motor driving apparatus according to an embodiment.

FIG. 1 is a circuit diagram illustrating a configuration of a motor driving apparatus according to an embodiment. FIG. 1 illustrates the electrical connections between the motor driving apparatus according to the embodiment and a motor including a plurality of winding groups. In the embodiment, as illustrated in FIG. 1, the motor 5 has a two-group three-phase structure. A first winding group 6 includes a U-phase winding portion 6U with one or more coils wound therearound, a V-phase winding portion 6V with one or more coils wound therearound, and a W-phase winding portion 6W with one or more coils wound therearound. And a second winding group 7 includes a U-phase winding portion 7U with one or more coils wound therearound, a V-phase winding portion 7V with one or more coils wound therearound, and a W-phase winding portion 7W with one or more coils wound therearound. The first winding group 6 and the second winding group 7 are not connected in the interior of the motor 5 and are electrically independent from each other. The motor 5 includes a stator and a rotor (not illustrated).

FIG. 1 illustrates, in addition to a first inverter 3, a second inverter 4, and the motor 5, a capacitor 1, a capacitor 2, a first current detector 8, a second current detector 9, a third current detector 10, a fourth current detector 11, a first induced voltage detector 50, a second induced voltage detector 51, a third induced voltage detector 52, and an inverter control unit 12. The capacitor 1 is a first smoothing unit for supplying direct-current power to the first inverter 3. The capacitor 2 is a second smoothing unit for supplying direct-current power to the second inverter 4. The first current detector 8 detects the U-phase current of the first winding group 6. The second current detector 9 detects the W-phase current of the first winding group 6. The third current detector 10 detects the U-phase current of the second winding group 7. The fourth current detector 11 detects the W-phase current of the second winding group 7. The first induced voltage detector 50 detects a voltage induced in the U phase of the second winding group 7 of the motor 5 (hereinafter referred to as "U-phase induced voltage"). The second induced voltage detector 51 detects an induced voltage induced in the V phase of the second winding group 7 of the motor 5 (hereinafter referred to as "V-phase induced voltage"). The third induced voltage detector 52 detects an induced voltage induced in the W phase of the second winding group 7 of the motor 5 (hereinafter referred to as "W-phase induced voltage"). The inverter control unit 12 controls the first inverter 3 and the second inverter 4.

As illustrated in FIG. 1, a current detector for detecting the V-phase current of the first winding group 6 and a current detector for detecting the V-phase current of the second winding group 7 are not provided. In this configuration, the V-phase current of the first winding group 6 can be obtained from the U-phase current detected by the first current detector 8 and the W-phase current detected by the second current detector 9. In the same way, the V-phase current of the second winding group 7 can be obtained from the U-phase current detected by the third current detector 10 and the W-phase current detected by the fourth current detector 11.

Detection currents detected by the first current detector 8, the second current detector 9, the third current detector 10, and the fourth current detector 11, induced voltages detected by the first induced voltage detector 50, the second induced voltage detector 51, and the third induced voltage detector 52, and detection voltages of the capacitor 1 and the capacitor 2 are input to the inverter control unit 12. The inverter control unit 12 controls the first inverter 3 and the second inverter 4 on the basis of the detection currents, induced voltages, and detection voltages.

The first inverter 3 is connected to the first winding group 6, and the second inverter 4 is connected to the second winding group 7. The first inverter 3 supplies first power to each of the plurality of phases of the first winding group 6, and the second inverter 4 supplies second power to each of the plurality of phases of the second winding group 7. The first winding group 6 and the second winding group 7 are respectively connected to the first inverter 3 and the second inverter 4 and are controlled by the first inverter 3 and the second inverter 4 independently and individually.

Note that FIG. 1 illustrates the case where the motor 5 has a two-group three-phase structure including two winding groups wound in three phases, but the number of winding groups of the motor 5 can be three or more, i.e., the motor 5 can have a multi-group three-phase structure. As a specific example, the first winding group 6 can include a plurality of winding portions. In a case where the first winding group 6 includes a plurality of winding portions, the current flowing through the winding group is divided so that it flows into a plurality of winding portions; therefore, the resistance of the entire winding group is small and the loss of power is low, which means that a motor capable of high output can be realized.

FIG. 1 illustrates an example in which the motor 5 is a three-phase motor. It is specifically an example in which each of the first winding group 6 and the second winding group 7 is wound in three phases of U, V, and W. However, the number of phases of the motor 5 is not limited to three but can be two, four, or more. In other words, the motor 5 can have a multi-group single-phase structure or a multi-group multi-phase structure.

FIG. 1 illustrates a case where the first inverter 3 is connected to the first winding group 6 and the second inverter 4 is connected to the second winding group 7, but it is also possible for at least one of the first inverter 3 and the second inverter 4 to include a plurality of inverters.

As a specific example of a case where a plurality of inverters is included, the first inverter 3 can include three three-phase inverters. Here, the three three-phase inverters constituting the first inverter 3 are identified as an inverter A, an inverter B, and an inverter C. In this configuration, each of the switching element pairs (not illustrated) of the three upper and lower arms constituting the inverter A supplies current to the U-phase winding portion 6U, each of the switching element pairs of the three upper and lower arms constituting the inverter B supplies current to the V-phase winding portion 6V, and each of the switching element pairs of the three upper and lower arms constituting the inverter C supplies current to the W-phase winding portion 6W. With this configuration, even though the current capacity of the inverters A, B, and C is small, it is possible to realize an inverter with a large current capacity by using the inverters A, B, and C together.

Another example of how to connect the first inverter 3 when it includes the three inverters A, B, and C is where the first switching element pair of the switching element pairs of the three upper and lower arms constituting the inverter A, the first switching element pair of the switching element pairs of the three upper and lower arms constituting the inverter B, and the first switching element pair of the switching element pairs of the three upper and lower arms constituting the inverter C can supply current to the U-phase winding portion 6U; the second switching element pair of the switching element pairs of the three upper and lower arms constituting the inverter A, the second switching element pair of the switching element pairs of the three upper and lower arms constituting the inverter B, and the second switching element pair of the switching element pairs of the three upper and lower arms constituting the inverter C can supply current to the V-phase winding portion 6V; and the third switching element pair of the switching element pairs of the three upper and lower arms constituting the inverter A, the third switching element pair of the switching element pairs of the three upper and lower arms constituting the inverter B, and the third switching element pair of the switching element pairs of the three upper and lower arms constituting the inverter C can supply current to the W-phase winding portion 6W. This way of connecting can also use the inverters A, B, and C, which have a small current capacity, to realize an inverter with a large current capacity by using the inverters A, B, and C together. Note that even when inverters and winding groups have a one-to-one relation, a multi (three or more)-group winding structure can be realized. In that case, the current capacity of each inverter and motor winding group can be reduced.

Figure 2:
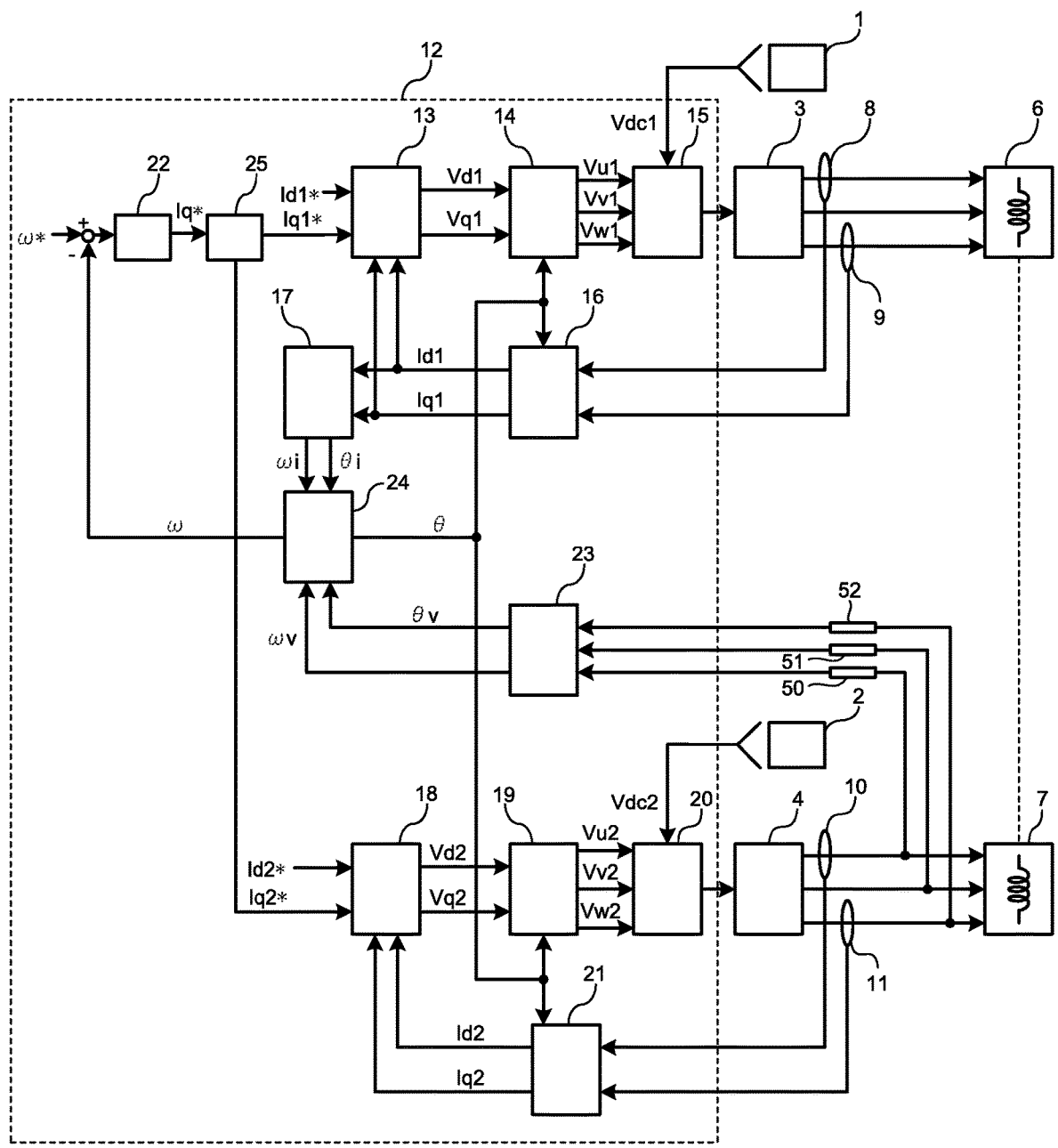
FIG. 2 is a block diagram illustrating an exemplary configuration of an inverter control unit according to the embodiment.

Next, the configuration of the inverter control unit 12 according to the embodiment will be described with reference to FIG. 2. FIG. 2 is a block diagram illustrating an exemplary configuration of the inverter control unit 12 according to the embodiment.

As illustrated in FIG. 2, the inverter control unit 12 according to the embodiment includes a first current control unit 13, a first voltage command generation unit 14, a first PWM signal generation unit 15, a first three-phase/two-phase conversion unit 16, a first speed estimation unit 17, a second current control unit 18, a second voltage command generation unit 19, a second PWM signal generation unit 20, a second three-phase/two-phase conversion unit 21, a torque current command unit 22, a second speed estimation unit 23, a speed estimation switching unit 24, and a torque current command distribution unit 25.

The first current control unit 13 is a control unit for controlling a d-axis current Id1 and a q-axis current Iq1 that the first inverter 3 passes through the first winding group 6. The first current control unit 13 obtains a d-axis voltage Vd1 and a q-axis voltage Vq1 on the basis of the d-axis current Id1 and the q-axis current Iq1 of the first inverter 3 calculated by the first three-phase/two-phase conversion unit 16 (described later), a first torque current command Iq1* for the first inverter 3 distributed by the torque current command distribution unit 25 (described later), and a d-axis current command Id1*, which is set in advance, input from an external source, or calculated.

The first voltage command generation unit 14 generates voltage commands Vu1, Vv1, and Vw1 to be applied to the first inverter 3 on the basis of the d-axis voltage Vd1 and the q-axis voltage Vq1 generated by the first current control unit 13 and a phase θ output from the speed estimation switching unit 24 (described later).

The first PWM signal generation unit 15, so as to control the first inverter 3, generates a PWM signal for controlling the switching elements of the first inverter 3 on the basis of the voltage commands Vu1, Vv1, and Vw1 generated by the first voltage command generation unit 14 and a voltage Vdc1 between the two ends of the capacitor 1.

On the basis of current information from the first current detector 8 and the second current detector 9 and the phase θ output from the speed estimation switching unit 24 (described later), the first three-phase/two-phase conversion unit 16 calculates the d-axis current Id1 and the q-axis current Iq1, which are current values in the dq coordinate system.

On the basis of the d-axis current Id1 and the q-axis current Iq1, the first speed estimation unit 17 estimates a first estimated speed ωi, which is one of the speed estimated values of the motor 5, and a first phase θi, which is one of the phase estimated values. Here, "i" appended to ω and θ means that it is an estimated value on the basis of current information. It is noted that the term "speed" as referred to herein is rotational speed, and rotational speed is the number of rotations per unit time.

The second current control unit 18 is a control unit for controlling a d-axis current Id2 and a q-axis current Iq2 that the second inverter 4 passes through the second winding group 7. The second current control unit 18 obtains a d-axis voltage Vd2 and a q-axis voltage Vq2 on the basis of the d-axis current Id2 and the q-axis current Iq2 of the second inverter 4 calculated by the second three-phase/two-phase conversion unit 21 (described later), a second torque current command Iq2* for the second inverter 4 distributed by the torque current command distribution unit 25 (described later), and a d-axis current command Id2*, which is set in advance, input from an external source, or calculated.

On the basis of the d-axis voltage Vd2 and the q-axis voltage Vq2 generated by the second current control unit 18 and the phase θ output from the speed estimation switching unit 24 (described later), the second voltage command generation unit 19 generates voltage commands Vu2, Vv2, and Vw2 to be applied to the second inverter 4.

The second PWM signal generation unit 20, so as to control the second inverter 4, generates a PWM signal for controlling the switching elements of the second inverter 4 on the basis of the voltage commands Vu2, Vv2, and Vw2 generated by the second voltage command generation unit 19 and a voltage Vdc2 between the two ends of the capacitor 2.

On the basis of current information from the third current detector 10 and the fourth current detector 11 and the phase θ output from the speed estimation switching unit 24 (described later), the second three-phase/two-phase conversion unit 21 calculates the d-axis current Id2 and the q-axis current Iq2, which are current values in the dq coordinate system.

On the basis of voltage information from the first induced voltage detector 50, the second induced voltage detector 51, and the third induced voltage detector 52, the second speed estimation unit 23 estimates a second estimated speed ωv, which is one of the speed estimated values of the motor 5, and a second phase θv, which is one of the phase estimated values. Here, "v" appended to ω and θ means that it is an estimated value on the basis of voltage information.

The speed estimation switching unit 24 determines which of the first estimated speed ωi and the first phase θi estimated by the first speed estimation unit 17 and the second estimated speed ωv and the second phase θv estimated by the second speed estimation unit 23 to output, and outputs the determined estimated speed and estimated phase, i.e., the speed estimation switching unit 24 controls the switching between outputting an estimated value on the basis of current information and outputting an estimated value on the basis of voltage information.

On the basis of the difference between a speed command ω* and an estimated speed ω output from the speed estimation switching unit 24, the torque current command unit 22 generates a torque current command for the entire motor 5 having a two-group three-phase structure. The torque current command, which is a torque current command Iq*, is output to the torque current command distribution unit 25.

On the basis of the entire torque current command Iq*, the torque current command distribution unit 25 generates the first torque current command Iq1* to be applied to the first inverter 3 and the second torque current command Iq2* to be applied to the second inverter 4; outputs the generated first torque current command Iq1* to the first current control unit 13; and outputs the generated second torque current command Iq2* to the second current control unit 18.

Next, a hardware configuration for realizing the functions of the inverter control unit 12 will be described with reference to FIG. 3. Note that the functions of the inverter control unit 12 are functions performed by the first current control unit 13, the first voltage command generation unit 14, the first PWM signal generation unit 15, the first three-phase/two-phase conversion unit 16, the first speed estimation unit 17, the second current control unit 18, the second voltage command generation unit 19, the second PWM signal generation unit 20, the second three-phase/two-phase conversion unit 21, the torque current command unit 22, the second speed estimation unit 23, the speed estimation switching unit 24, and the torque current command distribution unit 25, which are described as components of the inverter control unit 12.

Figure 3:
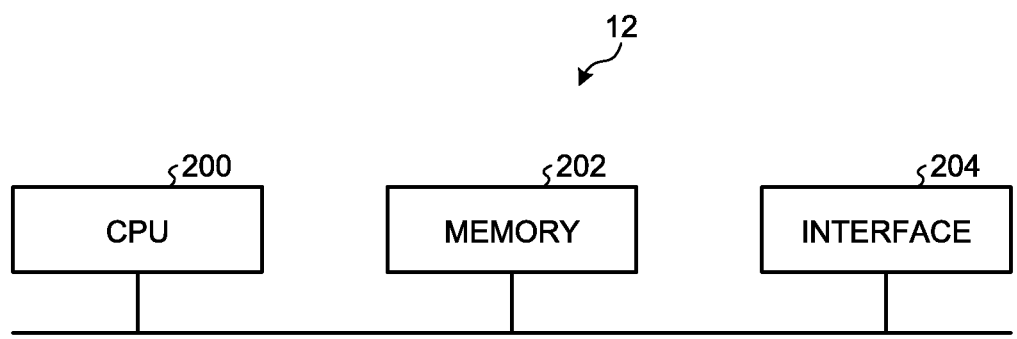
FIG. 3 is a block diagram illustrating an example of a hardware configuration for realizing the functions of the control unit of the embodiment.

The various functions above of the control unit can be realized with a configuration including a central processing unit (CPU) 200, a memory 202, and an interface 204 as illustrated in FIG. 3. The CPU 200 performs a calculation. Programs that are read by the CPU 200 are saved in the memory 202. Signals are input and output through the interface 204. The CPU 200 can be a calculating device, a microprocessor, a microcomputer, a processor, a digital signal processor (DSP), or the like. Examples of the memory 202 include nonvolatile or volatile semiconductor memories such as a random access memory (RAM), a read only memory (ROM), a flash memory, an erasable programmable ROM (EPROM), and an electrically EPROM (EEPROM).

Specifically, programs for executing the various functions of the control unit are stored in the memory 202. By exchanging necessary information via the interface 204, the CPU 200 executes the various calculating processes described in the embodiment.

Figure 4:
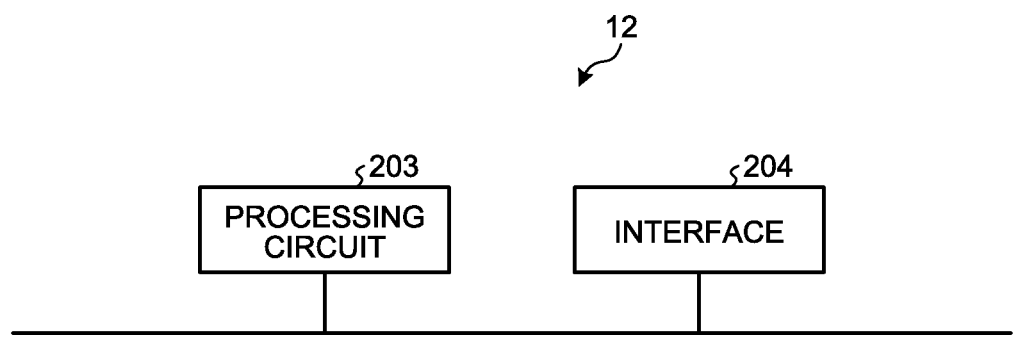
FIG. 4 is a block diagram illustrating another example of a hardware configuration for realizing the functions of the control unit of the embodiment.

Note that the CPU 200 and the memory 202 illustrated in FIG. 3 can be replaced with a processing circuit 203 as illustrated in FIG. 4. For example, the processing circuit 203 is a single circuit, a composite circuit, a programmed processor, a parallel programmed processor, an application specific integrated circuit (ASIC), a field-programmable gate array (FPGA), or a combination thereof.

Figure 5:
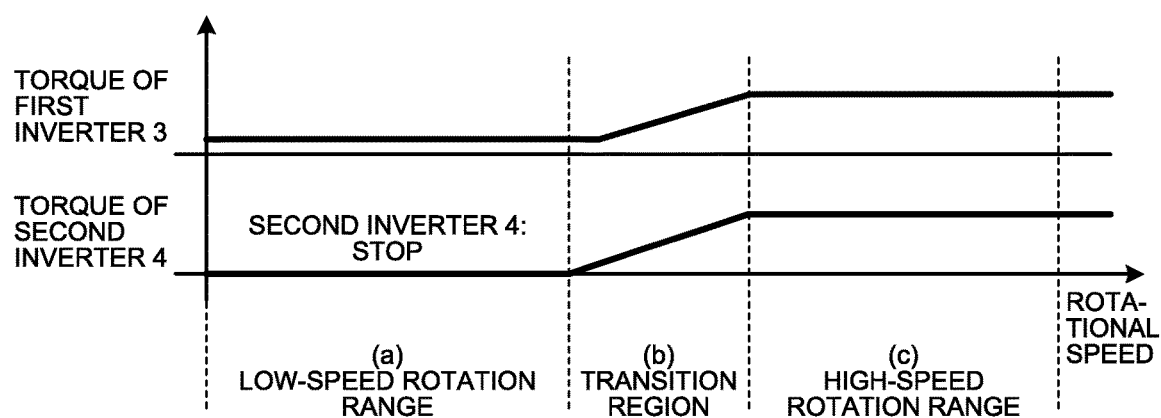
FIG. 5 is a diagram illustrating an example of the transition of the operation states of a first inverter and a second inverter observed when a motor is driven by the motor driving apparatus of the embodiment.
Figure 6:
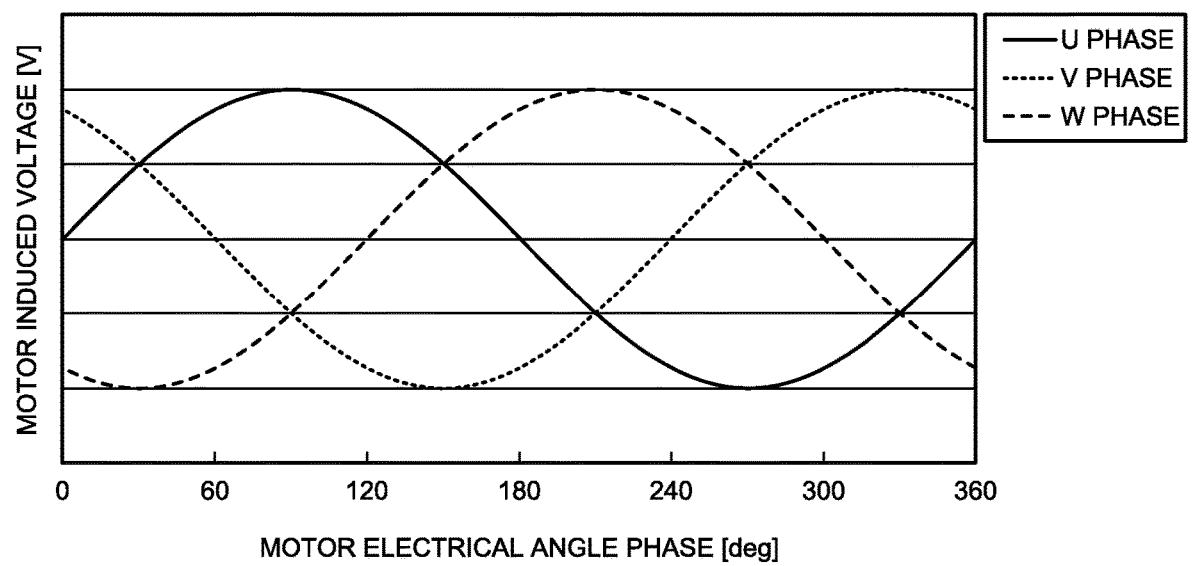
FIG. 6 is a diagram illustrating an example of an induced voltage induced in a winding group of the motor.

Next, the operation of the main parts of the motor driving apparatus according to the embodiment will be described with reference to the drawings of FIGS. 1 to 6. FIG. 5 is a diagram illustrating an example of the transition of the operation states of the first inverter 3 and the second inverter 4 observed when the motor 5 is driven by the motor driving apparatus of the embodiment. In this figure, the horizontal axis represents rotational speed, and the vertical axis represents torques applied to the first inverter 3 and the second inverter 4. FIG. 6 is a diagram illustrating an example of an induced voltage induced in a winding group of the motor 5. In this figure, the horizontal axis represents the motor electrical angle phase, and the vertical axis represents motor induced voltage. Note that the "motor electrical angle phase" is not a mechanical rotation angle obtained when the motor 5 rotates, but a phase angle converted into an electrical angle.

First, an example of the transition of the driving states illustrated in FIG. 5 will be described. In FIG. 5, region (a) is a low-speed rotation range, and region (c) is a high-speed rotation range. Region (b), between (a) and (c), is a transition region. In the low-speed rotation range (a), only the first inverter 3 is operated, and the second inverter 4 is stopped. In contrast, in the high-speed rotation range (c), both the first inverter 3 and the second inverter 4 are operated. In the transition region (b), the torques of both the first inverter 3 and the second inverter 4 are increased.

When the second inverter 4 is stopped, a motor induced voltage as illustrated in FIG. 6 is generated in the second winding group 7. This motor induced voltage is detected by the first induced voltage detector 50, the second induced voltage detector 51, and the third induced voltage detector 52. The second speed estimation unit 23 uses voltage information detected by the first induced voltage detector 50, the second induced voltage detector 51, and the third induced voltage detector 52 so as to estimate the second estimated speed ωv and the second phase θv.

The second speed estimation unit 23 detects the induced voltage of the motor 5 when the second inverter 4 is stopped. The induced voltage detected when the second inverter 4 is stopped is not the voltage applied by the second inverter 4 to the second winding group 7 but the voltage induced in the second winding group 7 by the voltage applied by the first inverter 3 to the first winding group 6. Therefore, by using the first induced voltage detector 50, the second induced voltage detector 51, and the third induced voltage detector 52, a three-phase motor induced voltage having clean waveforms and small phase angle fluctuations can be detected. Consequently, the second estimated speed ωv and the second phase θv, which are speed and phase estimated values, can be estimated with high accuracy.

In the example in FIG. 5, the second inverter 4 is stopped in the low-speed rotation range, i.e., when the driving is at a low speed. To be more specific, control is performed in the following manner: a first speed for defining the boundary between the low-speed rotation range (a) and the transition region (b) is set in advance; the second inverter 4 is stopped if the speed of the motor 5 is equal to or less than the first speed; and the second inverter 4 is operated if the speed of the motor 5 is equal to or greater than the first speed.

In the example in FIG. 5, speed is used as the condition for stopping the second inverter 4, but the condition can be load magnitude, i.e., control is performed such that the second inverter 4 is stopped if the driving load of the motor 5 is equal to or less than a load value set in advance; and the second inverter 4 is operated if the driving load of the motor 5 is equal to or greater than the load value.

The reason why the second inverter 4 is stopped during a low-speed rotation or when under a low load is that, in many cases, loss can be reduced to a greater extent when one of the inverters is stopped than when both inverters are driven. Another reason is that the degree of modulation is small when under a low load and controllability tends to worsen.

For the reasons described above, the speed estimation switching unit 24 selects output values from the first speed estimation unit 17, i.e., the first estimated speed ωi and the first phase θi, as the output of the speed estimation switching unit 24 during normal operation, in which both the first inverter 3 and the second inverter 4 are operated; and it selects output values from the second speed estimation unit 23, i.e., the second estimated speed ωv and the second phase θv, as the output of the speed estimation switching unit 24 during a reduced operation, in which only the first inverter 3 is operated and the second inverter 4 is stopped.

In the example in FIG. 2, speed estimation during the normal operation (hereinafter referred to as "normal speed estimation" for the sake of convenience) is performed using the first winding group 6; but the normal speed estimation can be performed using the second winding group 7. In this case, FIG. 2 only needs to be changed such that the output of the second three-phase/two-phase conversion unit 21 is input to the first speed estimation unit 17; and in which case, it is not necessary to input the output of the first three-phase/two-phase conversion unit 16 to the second speed estimation unit 23.

As described above, when the second inverter 4 is stopped, it is possible to use the highly accurate second estimated speed ωv and second phase θv by using the output of the second speed estimation unit 23. Therefore, it is possible to achieve stable driving even in the low-speed rotation range in which controllability is said to worsen.

In the above description, low-speed operation and low-load operation are described as examples. However, if the total capacity of the driven inverters is equal to or greater than the load, an inverter can be stopped, which corresponds to an excessive capacity or less according to circuit loss and motor loss. As a specific example, in a case where the rated value of the first inverter 3 is 20 KVA and the rated value of the second inverter 4 is 20 KVA, if the load is 20 KVA or less, the second inverter 4 can be stopped.

Figure 7:
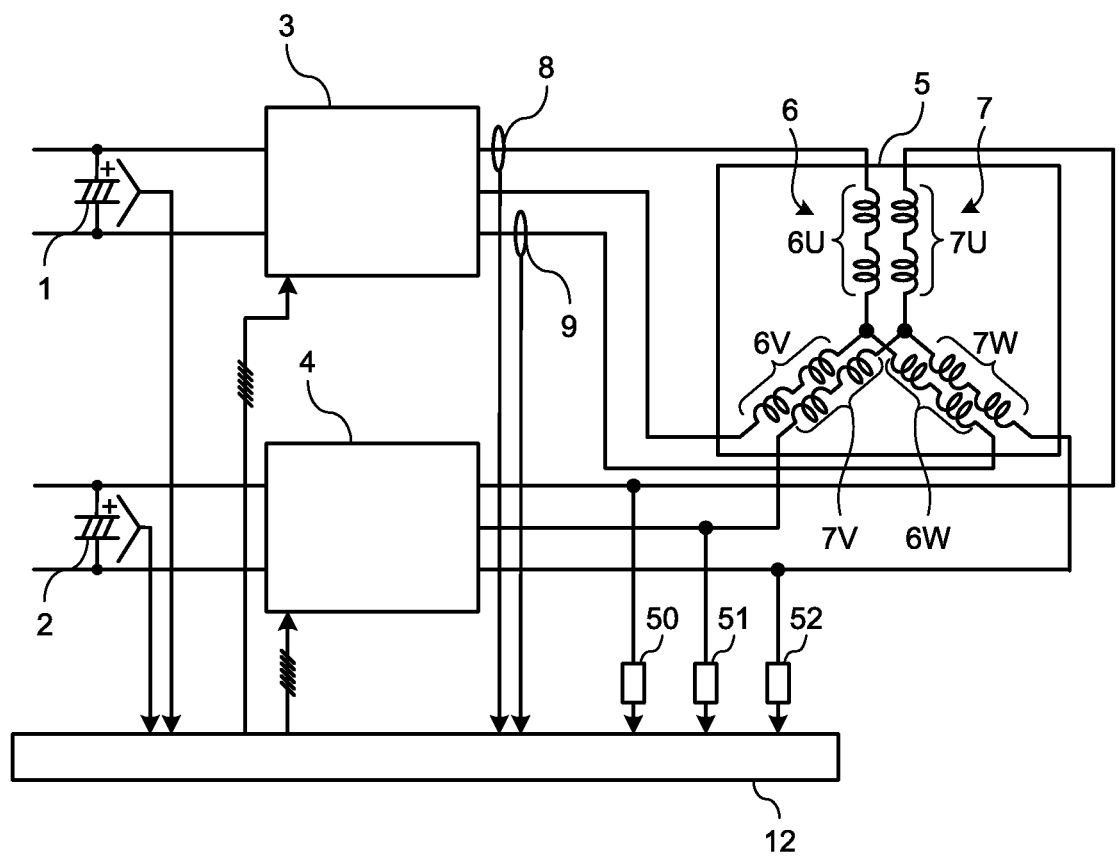
FIG. 7 is a circuit diagram illustrating a configuration of the motor driving apparatus according to an embodiment different from that of FIG. 1.

In FIG. 1, the outputs of the third current detector 10 and the fourth current detector 11 are input to the inverter control unit 12, but as illustrated in FIG. 7, the third current detector 10 and the fourth current detector 11 can be omitted; and in which case, both the first inverter 3 and the second inverter 4 are controlled on the basis of the current flowing through the first inverter 3. Because the number of current detectors can be reduced with this configuration, the costs can be reduced.

Figure 8:
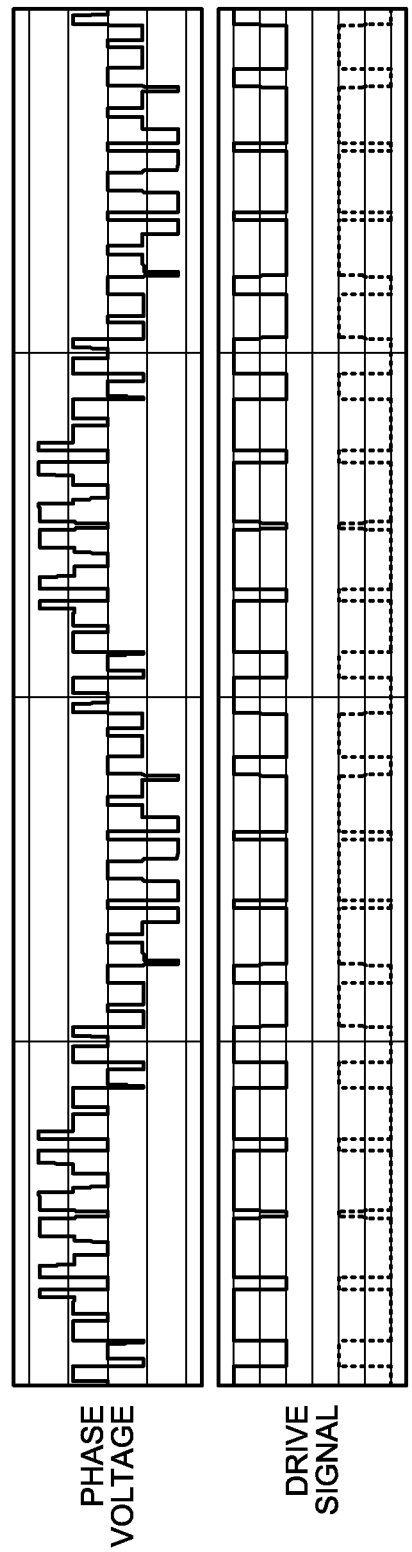
FIG. 8 is a diagram illustrating a drive signal applied to an inverter and the waveform of a voltage output from the inverter when it is performing general sine wave PWM control.
Figure 9:
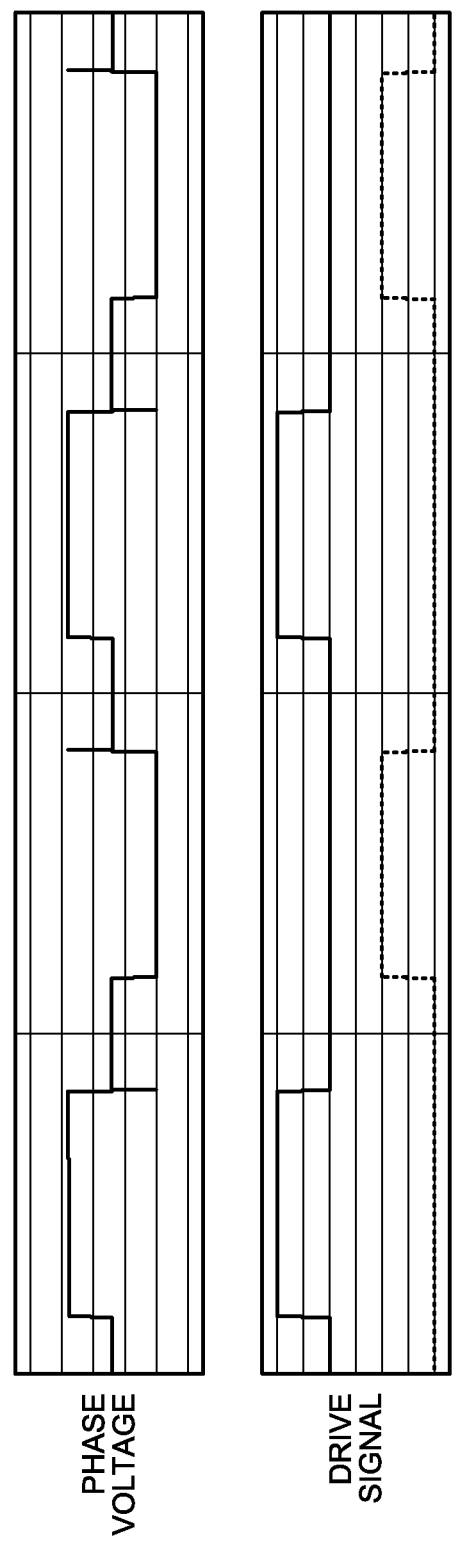
FIG. 9 is a diagram illustrating a drive signal applied to an inverter and the waveform of an output voltage output from the inverter when it is performing general rectangular wave control.

Next, drive signals to be applied to the first inverter 3 and the second inverter 4 will be described. FIG. 8 is a diagram illustrating a drive signal applied to an inverter and the waveform of a voltage output from the inverter when performing general sine wave PWM control (simply referred to as "sine wave control"). In FIG. 8, the waveform at the upper stage is the phase voltage waveform applied to the motor winding by the inverter; and the waveform at the lower stage is the waveform of the drive signal (PWM signal) applied to the inverter. FIG. 9 is a diagram illustrating a drive signal applied to an inverter and the waveform of a voltage output from the inverter when performing general rectangular wave control. In FIG. 9, the waveform at the upper stage is the phase voltage waveform applied to the motor winding by the inverter, and the waveform at the lower stage is the waveform of the drive signal (rectangular wave signal with 120° conduction) applied to the inverter.

There is no problem if the second inverter 4 is subjected to rectangular wave control while the first inverter 3 is subjected to sine wave control. In the case where the second inverter 4 is subjected to rectangular wave control, if the weight of the first inverter 3 subjected to sine wave control is increased, the stability of control is enhanced, and the stability regarding evaluation items of vibration and sound can be enhanced. Here, the term "increasing the weight" means increasing the output.

In contrast, if the weight of the second inverter 4 subjected to rectangular wave control is increased, switching loss can be reduced. With rectangular wave control, high-frequency switching can be performed at the waveform portions in the first and second half. Although a rectangular wave signal with 120° conduction is exemplified in FIG. 9, a rectangular wave signal with 150° conduction can be used. In summary, intermittent conduction including a section in which all the switching elements of the upper and lower arms (not illustrated) for each phase provided in each inverter do not perform switching operation can achieve similar effects.

In the embodiment, an example in which the motor having a two-group three-phase structure is driven by the two inverters has been described. However, even with a motor having three or more winding groups, similar effects can be obtained by providing an inverter including one or more induced voltage detectors.

In the embodiment, the smaller the capacity of the winding group to which the inverter including the induced voltage detector is connected, the larger the motor output that can be driven even when the inverter is stopped, which makes it possible to utilize the induced voltage detection over a wide range.

In theory, the above description means that a winding with an extremely small capacity that is not used for driving can be provided. By providing a winding with an extremely small capacity that is not used for driving and of which terminal of the winding is open, it is possible to detect induced voltages in the entire operation region at the winding. As a result, position estimation can be performed with high accuracy, and motor driving with high efficiency and high reliability is enabled.

Figure 10:
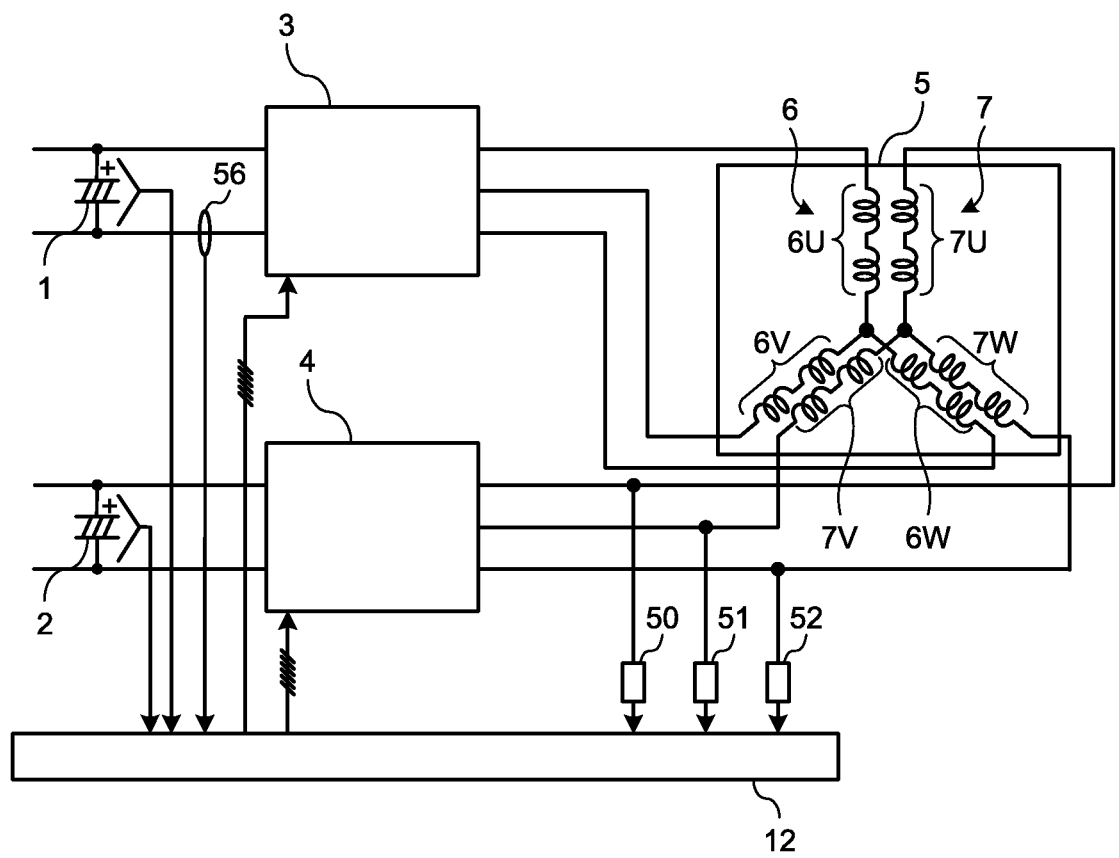
FIG. 10 is a circuit diagram illustrating a configuration of the motor driving apparatus according to an embodiment different from those of FIGS. 1 and 7.

In the embodiment, motor currents are directly detected by the current detectors. However, as illustrated in FIG. 10, a direct-current detector 56 can be provided on the direct-current side of the first inverter 3, and the detection value of the direct-current detector 56 can be input to the inverter control unit 12. In this case, under a low load, motor currents can be estimated simply from detection information on induced voltages detected by the first induced voltage detector 50, the second induced voltage detector 51, and the third induced voltage detector 52 and detection information on a direct current detected by the direct-current detector 56, and effects similar to the effects obtained by detecting motor currents can be obtained.

One technique of detecting direct current is to use a shunt resistor. The use of a shunt resistor enables construction of a system at low cost and stable driving in the low-speed rotation range. However, when a shunt resistor is used, the output period of the real vector becomes shorter under the condition of a low degree of modulation, which can make it difficult to detect direct current. In such a case, V/F control can be performed by using an estimated value from the second speed estimation unit 23.

Figure 11:
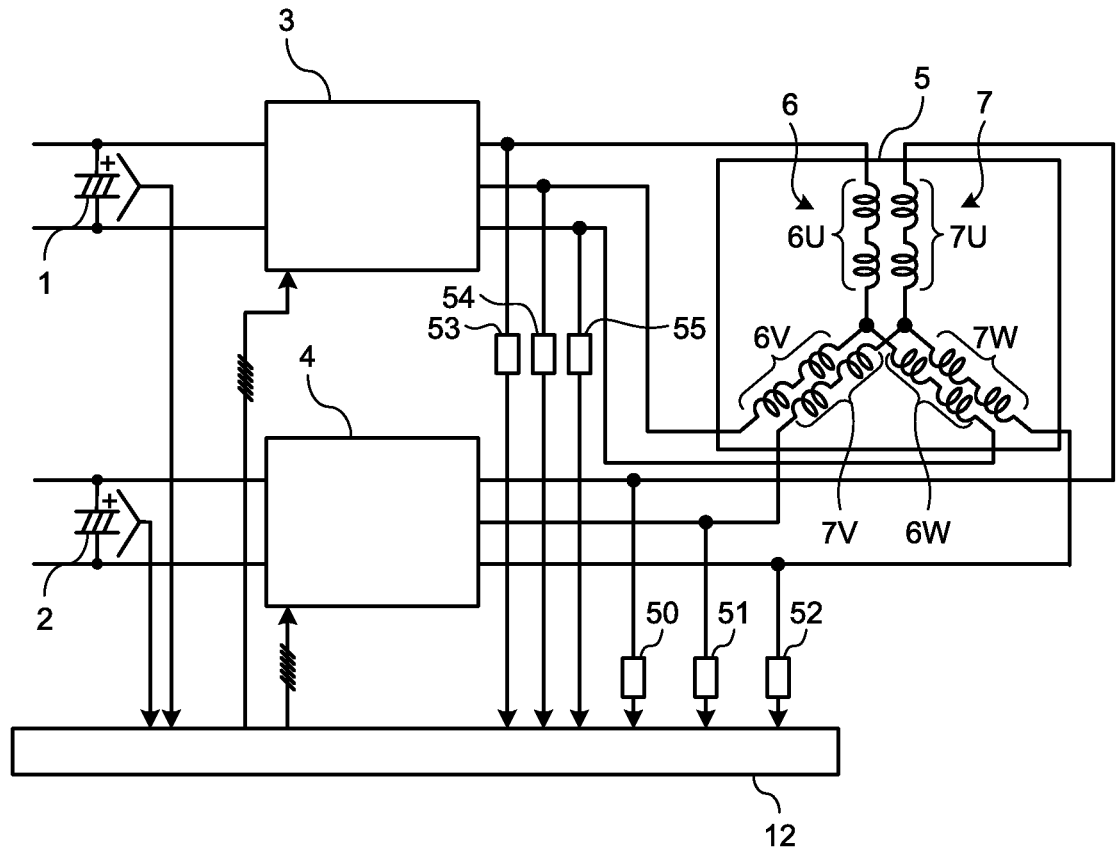
FIG. 11 is a circuit diagram illustrating a configuration of a motor driving apparatus according to an embodiment different from those of FIGS. 1, 7, and 10.

In the embodiment, motor currents of both the first inverter 3 and the second inverter 4 or either the first inverter 3 or the second inverter 4 are detected. However, as illustrated in FIG. 11, a fourth induced voltage detector 53 for detecting a U-phase induced voltage induced in the first winding group 6 of the motor 5, a fifth induced voltage detector 54 for detecting a V-phase induced voltage induced in the first winding group 6 of the motor 5, and a sixth induced voltage detector 55 for detecting a W-phase induced voltage induced in the first winding group 6 of the motor 5 can be provided. In this case, if rectangular wave control is performed on both the first inverter 3 and the second inverter 4, six timings at which the zero-cross point of an induced voltage can be detected exist in each inverter during one motor electrical angle cycle. Therefore, in the case of a motor having a two-group three-phase structure, it is possible to perform zero-cross detection up to twelve times. Consequently, a motor having a two-group three-phase structure has twice as many chances of updating speed and phase as a normal three-phase motor. By having twice as many chances of updating, estimation errors are reduced, and thus motor driving with high accuracy is enabled.

Although the current detectors are provided on the output side of at least one inverter in the embodiment, the current flowing through the lower arm of the corresponding inverter can be detected by a shunt resistor. The use of a shunt resistor enables construction of a system at low cost.

Because an induced voltage detector can generally be constructed at low cost compared with a current detector, cost increases can be reduced. Cost reduction can also be achieved by performing motor control on the basis of induced voltage detectors as an alternative to current detectors.

In addition, FIG. 1 illustrates a configuration in which a smoothing unit and a converter (not illustrated) are connected to each inverter. However, it is also possible to provide a common converter and a common output bus to use the voltage applied by the common converter to the common output bus as the input voltage to each inverter.

Although in FIG. 1, the second inverter 4 has three induced voltage detectors, the number of induced voltage detectors can be two or one, and even in this case it is still possible to detect phases.

If a switching element is formed from a wide bandgap semiconductor, the inverter loss can be reduced, and thus a system with high efficiency can be realized. In particular, when applied to an inverter subjected to sine wave control, the loss in switching reduces a lot. Furthermore, when making a difference in the weight for the operation of each inverter, a wide bandgap semiconductor is used for an inverter having a large weight, and thus a large loss-reduction can be obtained.

As described above, it is possible to obtain a driving system with high efficiency and high reliability by using the motor driving apparatus of the embodiment.

Figure 12:
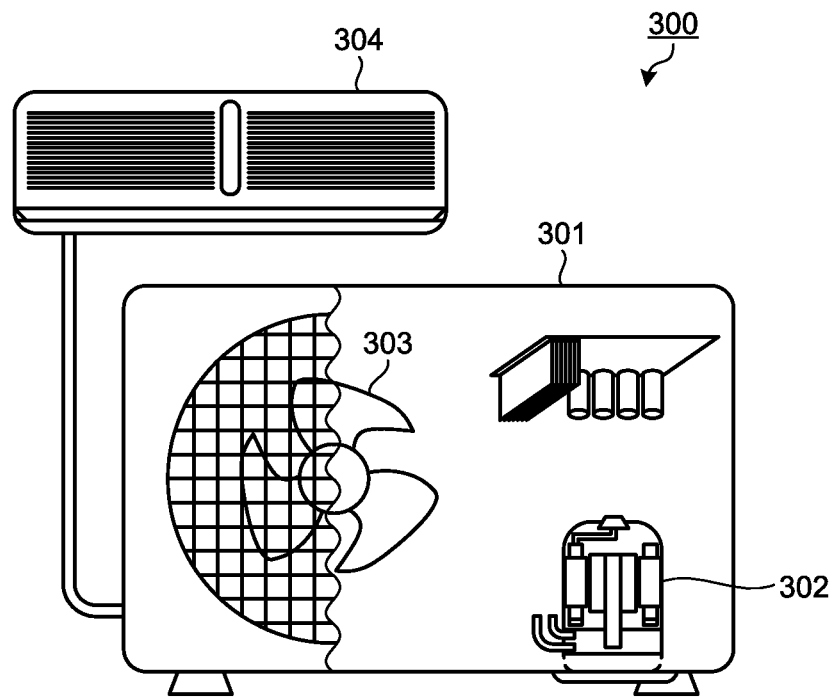
FIG. 12 is a diagram illustrating an example in which the motor driving apparatus according to an embodiment is used in an air conditioner.
Figure 13:
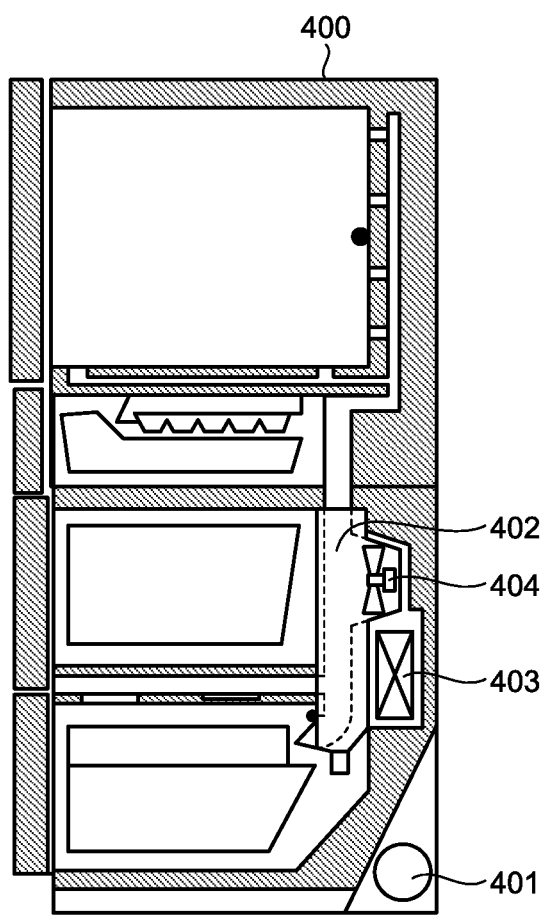
FIG. 13 is a diagram illustrating an example in which the motor driving apparatus according to an embodiment is used in a refrigerator.

Further, the motor driving apparatus according to the embodiment described above is suitable for an air conditioner and a refrigerator. FIG. 12 is a diagram illustrating an example in which the motor driving apparatus according to the embodiment is used in an air conditioner. FIG. 13 is a diagram illustrating an example in which the motor driving apparatus according to the embodiment is used in a refrigerator.

As illustrated in FIG. 12, the air conditioner 300 in which the motor driving apparatus according to the embodiment is used includes an outdoor unit 301 and an indoor unit 304. The outdoor unit 301 is connected to a refrigerant circuit (not illustrated) and includes a refrigerant compressor 302 constituting a refrigeration cycle and a blower 303 that blows air at a heat exchanger (not illustrated). The refrigerant compressor 302 and the blower 303 are rotationally driven by a motor driven by the motor driving apparatus according to the above-described embodiment. The effects of the above-described embodiment can be obtained by the air conditioner 300 in which the motor driving apparatus according to the embodiment is used in the above-mentioned manner.

As illustrated in FIG. 13, the refrigerator 400 in which the motor driving apparatus according to the embodiment is used includes a refrigerant compressor 401, a cooling chamber 402, a cooler 403, and a blower 404 for circulating cool air. The refrigerant compressor 401 is connected to a refrigerant circuit (not illustrated) and constitutes a refrigeration cycle. The cooler 403 is provided in the cooling chamber 402. The blower 404 supplies cool air generated by the cooler 403 to each refrigerating compartment and freezing compartment. The refrigerant compressor 401 and the blower 404 are rotationally driven by a motor driven by the motor driving apparatus according to the above-described embodiment. The effects of the above-described embodiment can be obtained by the refrigerator 400 in which the motor driving apparatus according to the embodiment is used in the above-mentioned manner.

As described above, according to the motor driving apparatus of the embodiment, for a motor including a plurality of winding groups each consisting of three winding portions to which a three-phase alternating-current voltage is applied, a plurality of inverters that applies the alternating-current voltage to at least one of the winding groups is provided, and one or more induced voltage detectors that detect an induced voltage induced by at least one of the winding portions of at least one of the winding groups are provided. Therefore, the effect of reducing the worsening of controllability even when controlling a motor having a multi-group winding structure can be achieved. In addition, rectangular wave control can be performed, and driving can be performed with simple control, and thus the effect of reducing switching loss can be achieved. Furthermore, because the position detection accuracy is improved, the effect of performing motor control with high accuracy can be achieved.

Further, according to the motor driving apparatus of the embodiment, at least one or more of the inverters that do not include the induced voltage detector include a current detector that detects a motor current. Therefore, sine wave application to at least one winding group is enabled, and thus the effect of performing motor driving with high accuracy can be achieved.

In the motor driving apparatus according to the embodiment, the inverter including the induced voltage detector can be subjected to rectangular wave control. Because rectangular wave control decreases the number of inverter switching times, the effect of reducing switching loss can be achieved.

Further, in the motor driving apparatus according to the embodiment, when the speed of the motor is equal to or less than a first speed or when the driving load of the motor is equal to or less than a preset load value, any of the plurality of inverters can be stopped. Consequently, because the number of inverters operating under a low load is reduced, the effect of reducing inverter loss can be achieved.

Further, in the motor driving apparatus according to the embodiment, when any of the plurality of inverters are stopped, the inverter including the induced voltage detector can be one of the invertors stopped. Consequently, it is possible to detect induced voltages in all the phases, and the phase detection accuracy is improved, and thus the effect of performing motor driving with high accuracy can be achieved.

Further, in the motor driving apparatus according to the embodiment, the inverter that does not include the induced voltage detector can be controlled on the basis of detection information from the induced voltage detector. Consequently, it is possible to subject the inverter to rectangular wave control at an appropriate timing, and thus the effect of reducing loss and improving controllability can be achieved.

Further, in the motor driving apparatus according to the embodiment, a switching element of the inverter subjected to sine wave control can include a wide bandgap semiconductor element. Consequently, the loss in the switching element is reduced, and thus the effect of performing motor driving with high efficiency can be achieved.

In addition, in the motor driving apparatus according to the embodiment, control can be performed such that the output of the inverter subjected to sine wave control is larger than the output of the inverter subjected to rectangular wave control. This control improves controllability, and thus the effect of performing motor driving with high accuracy can be achieved.

Further, in the motor driving apparatus according to the embodiment, control can be performed such that the output of the inverter subjected to rectangular wave control is larger than the output of the inverter subjected to sine wave control. This control reduces switching loss, and thus the effect of performing motor driving with high efficiency can be achieved.

Note that the configuration described in the above-mentioned embodiment indicates an example of the present invention. The configuration can be combined with other well-known techniques, and a part of the configuration can be omitted or changed to an extent not departing from the gist of the present invention.

The invention claimed is:

1. A motor driving apparatus used for driving a motor comprising a plurality of winding groups, each of the winding groups comprising three winding portions to which a three-phase alternating-current voltage is applied, each of the winding groups forming an electrically independent circuit, the motor driving apparatus comprising:
at least one inverter applying the alternating-current voltage to at least one of the winding groups; and
an induced voltage detector detecting an induced voltage induced by at least one of the winding portions of at least one of the winding groups
wherein when stopping any of the plurality of inverters, an inverter including the induced voltage detector is stopped.

2. The motor driving apparatus according to claim 1, wherein
the winding groups include first and second winding groups, and
the inverters include
a first inverter to apply a first three-phase alternating-current voltage to the first winding group and
a second inverter to apply a second three-phase alternating-current voltage to the second winding group.

3. The motor driving apparatus according to claim 1, wherein
at least one or more of the inverters that do not include the induced voltage detector include a current detector to detect a motor current.

4. The motor driving apparatus according to claim 3, wherein
the current detector is provided on an output side of the inverter.

5. The motor driving apparatus according to claim 3, wherein
the current detector is provided on an input side of the inverter.

6. The motor driving apparatus according to claim 1, wherein
the inverter including the induced voltage detector is subjected to rectangular wave control.

7. The motor driving apparatus according to claim 1, wherein
the inverter that does not include the induced voltage detector is controlled on the basis of detection information from the induced voltage detector.

8. The motor driving apparatus according to claim 1, wherein
when a speed of the motor is equal to or less than a first speed or when a driving load of the motor is equal to or less than a preset load value, any of the plurality of inverters is stopped.

9. The motor driving apparatus according to claim 1, wherein
a switching element of the inverter subjected to sine wave control includes a wide bandgap semiconductor element.

10. The motor driving apparatus according to claim 1, wherein
output of the inverter subjected to sine wave control is larger than output of the inverter subjected to rectangular wave control.

11. The motor driving apparatus according to claim 1, wherein
output of the inverter subjected to rectangular wave control is larger than output of the inverter subjected to sine wave control.

12. An air conditioner comprising the motor driving apparatus according to claim 1.

13. A refrigerator comprising the motor driving apparatus according to claim 1.

* * * * *